United States Patent [19]
Alston

[11] Patent Number: 4,541,010
[45] Date of Patent: Sep. 10, 1985

[54] ELECTRONIC IMAGING CAMERA

[75] Inventor: Lawrence E. Alston, Chelmsford, Mass.

[73] Assignee: Polaroid Corporation, Cambridge, Mass.

[21] Appl. No.: 505,426

[22] Filed: Jun. 17, 1983

[51] Int. Cl.³ ............................................... H04N 9/07
[52] U.S. Cl. ........................................................ 358/44
[58] Field of Search ................. 358/43, 212, 213, 224, 358/310, 331, 332, 333, 335, 342, 345, 906, 44, 358/75, 76, 41; 360/9.1, 10.1, 10.3, 35.1; 357/24 R, 24 LR

[56] References Cited

U.S. PATENT DOCUMENTS

| | | | |
|---|---|---|---|
| 4,037,249 | 7/1977 | Pugsley | 358/76 |
| 4,057,830 | 11/1977 | Adcock | 360/35.1 |
| 4,131,919 | 12/1978 | Lloyd et al. | 360/9.1 |
| 4,161,749 | 7/1979 | Erlichman | 358/75 |
| 4,231,061 | 10/1980 | Freeman | 358/76 |
| 4,262,301 | 4/1981 | Erlichman | 360/10.3 |
| 4,263,623 | 4/1981 | Woo et al. | 360/10.3 |
| 4,264,921 | 4/1981 | Pennington et al. | 358/50 |
| 4,346,401 | 8/1982 | Ohara | 358/75 |

OTHER PUBLICATIONS

*Digital Image Processing*, by Rafael Gonzalez and Paul Wintz, pp. 26–27, Addison–Wesley, 1977.

*Primary Examiner*—Michael A. Masinick
*Assistant Examiner*—Randall S. Svihla
*Attorney, Agent, or Firm*—Edward S. Roman

[57] ABSTRACT

An electronic camera for providing a photographic quality still print includes a viewfinder display in which the scene to be photographed may be viewed for composition at a standard television transfer frame rate without the provision of additional buffer memories. The electronic camera comprises an integral charge coupled device (CCD) sensing configuration which operates to sense the image to be recorded in a preview mode of operation and to provide a real time digital buffer memory during a succeeding review mode of operation in order to display the recorded scene in the viewfinder at a standard television frame transfer rate.

20 Claims, 1 Drawing Figure

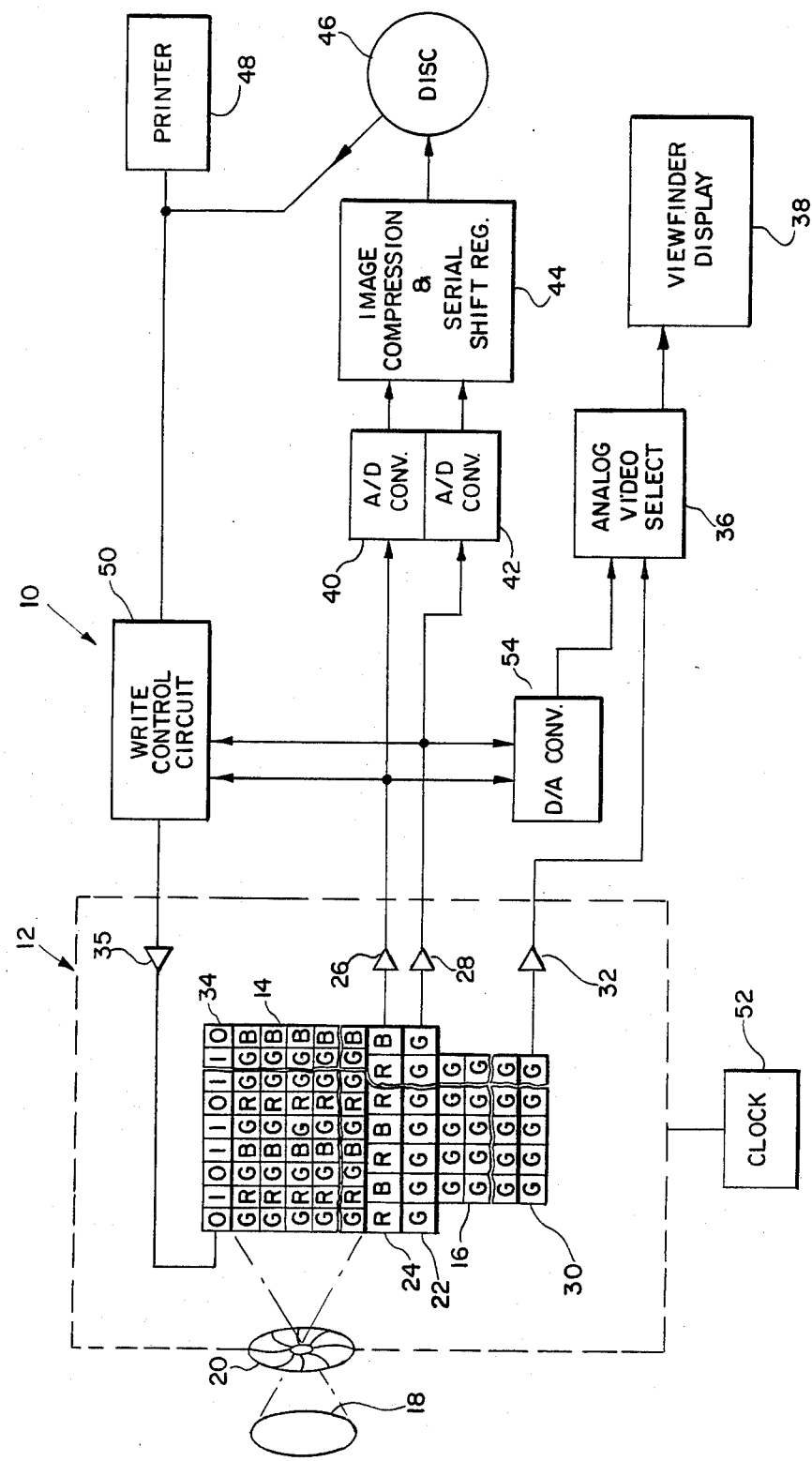

ELECTRONIC IMAGING CAMERA

BACKGROUND OF THE INVENTION

1. Field of the Invention

This invention relates generally to an electronic camera and, more particularly, to an electronic camera utilizing a charge coupled device (CCD) array as both an image sensing device and a buffer memory.

2. Description of the Prior Art

Still photographic quality electronic cameras require a high resolution image sensing array comprising a substantially higher number of pixels than is required for a standard home television image. This high resolution leads to data transfer problems since the transfer of photographic image data to a digital recording medium cannot be practically completed in a standard television frame of 1/30th of a second. Such electronic cameras generally include a viewfinder comprising a cathode ray tube. The high number of image sensing pixels, however, required to make a photographic quality still print imposes additional memory requirements in order to preview the scene to be photographed through the viewfinder CRT at standard television frame rates with standard television components. Such additional memory requirements are provided by buffer memories which substantially increase the cost, size and power consumption of the electronic camera.

The number of image sensing pixels generally required for an electronic camera to produce a photographic quality still print is in the order of 500,00 to 1 million pixel sensing areas. In order to preview the image to be photographed through the screen of the viewfinder CRT, the image data must be transferred from the image sensing array which generally comprises a charge coupled device (CCD), at an operating frequency in the order of 15 to 30 megahertz in order to operate at a standard television frame transfer rate (30 frames per second). This high rate of video transfer from the image sensing array when digitized generates serial digital data rates in excess of 100 megahertz. Such high frequencies are not practical for the operation of a buffer memory, an image sensing array, or a magnetic disc in a consumer oriented product. In addition, as previously discussed, the amount of image data required to be stored in the frame buffer memory is so large that the cost and size of the buffer memory also becomes prohibitive for a consumer oriented product.

Therefore, it is a primary object of this invention to provide an electronic camera which can provide a photographic quality still print of an image which can be previewed at standard television frame transfer rates without the provision of an additional buffer memory.

It is a further object of this invention to provide an electronic camera which can provide a photographic quality still print of a scene which can be previewed and reviewed from a viewfinder display wherein the image is sensed by a standard CCD array which may be operated in a second mode as a digital buffer memory to allow the imaged scene to be reviewed prior to printing.

It is a further object of this invention to provide an electronic camera for recording still photographic quality prints at a high resolution while allowing for the preview of the scene to be photographed at a low resolution compatible with the standard television frame rate of 1/30th of a second.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

An electronic camera for recording still images comprises a two-dimensional image sensing array including a predetermined number of discrete image sensing areas or pixels. There is also provided a two-dimensional image storing array comprising a predetermined number of discrete image storing areas. The predetermined number of discrete image storing areas is substantially less than the predetermined number of discrete image sensing areas. The camera also includes a viewfinder display together with means for recording image data on a select recording medium. Means are provided for controlling the transfer of image data sampled from the image sensing array to the image storing array during a preview mode of operation and for subsequently transferring the image data stored in the image storing array to the viewfinder display to provide a visual display of the image data during the preview mode of operation. A control means also provides for the transfer of the image data from the image sensing array to the image recording means to enable the image data to be recorded by the recording means during a recording mode of operation. The control means also provides for the transfer of image data from the recording means to the display means by way of the image sensing array to provide a visual display of the recorded image data during a review mode of operation. In the preferred mode, the image sensing and storing arrays are configured as an integral charge coupled device (CCD) structure.

DESCRIPTION OF THE DRAWING

The novel features that are considered characteristic of the invention are set forth with particularity in the appended claims. The invention itself, however, both as to its organization and method of operation together with other objects and advantages thereof will be best understood from the following description of the illustrated embodiment when read in connection with the accompanying drawing wherein:

The drawing is a block diagram of the electronic camera of this invention.

DESCRIPTION OF THE PREFERRED EMBODIMENT

Referring to the drawing, there is shown at 10 an electronic camera according to the invention comprising an objective lens 18 for focusing an image of the scene to be photographed through a shutter 20 onto a focal plane comprising a high resolution two-dimensional image sensing array 14 which may be one portion of a charge coupled device (CCD) array as shown generally at 12. The image sensing array 14 comprises a predetermined number of discrete image sensing areas or pixels arranged in vertical columns and horizontal rows wherein each column is superposed by either a green, red or blue filter arranged in a well-known manner as shown in the drawing. The CCD array 12 also includes two high resolution serial shift registers 22 and 24 having respective preamplifiers 26 and 28. In a preferred mode the shift register 22 is connected with respect to the image sensing array 14 so as to transfer the image data from only those image sensing areas of the image sensing array 14 which reside in columns superposed by green filters. In like manner the shift register 24 is connected with respect to the image sensing array 14 so as to transfer the image data of only those image sensing areas arranged in columns covered by the red and blue filters. As is readily apparent, the image sensing array 14 is housed in a suitable lighttight camera housing not shown in the drawing.

The CCD array 12 further comprises a low resolution two-dimensional image storing array 16 comprising a predetermined number of discrete image storing areas or pixels wherein the number of image storing areas is chosen to be substantially less than the number of image sensing areas in the image sensing array 14 for reasons which will become apparent from the following discussion. Image data from the image sensing array 14 is transferred to the image storing array 16 only by the shift register 22 in the manner of this invention to be subsequently described herein. Thus, it can be seen that the image storing array 16 stores only the image data from the columns of the image sensing array 14 superposed by green filters. Image data stored by the image storing array 16 is transferred therefrom by a low resolution serial shift register 30 and output preamplifier 32 in a manner to be subsequently described herein. The CCD array 12 further comprises a high resolution serial-to-parallel write shift register 34 and input driver amplifier 35 for inputting image data to the image sensing array 14 during a mode of operation when the image sensing array 14 operates as a digital frame buffer in a manner to be subsequently described herein.

The CCD array 12 may be constructed in a well-known manner on a chip of semiconductor material in a two phase frame transfer type of configuration. Alternatively, the CCD array 12 could be constructed as a three phase or a four phase device.

Clock signals required to control the transfer of image data between the shift registers, and image sensing and storage arrays 14 and 16 are provided in a well-known manner by a clock 52. The image data transferred from the image storage array 16 by the shift register 30 is directed by way of an analog multiplexing video select circuit 36 to a viewfinder display 38 which may comprise either a cathode ray tube (CRT) or liquid crystal display (LCD). Image data transferred from the image sensing array 14 by the shift registers 22 and 24 can be directed either to the analog multiplexing video select circuit 36 by way of digital-to-analog converter 54 or to a recording device such as a magnetic disc memory 46 by way respectively of a pair of analog-to-digital converters 40 and 42 and an image compression and serial shift register circuit as shown at 44. The image data recorded on the disc memory 46 may be directed to a printer 48 in order to provide a still photographic print of the image data stored by the disc memory 46. The image data from the disc memory 46 may also be directed by way of a write control circuit 50 to the high resolution serial-to-parallel write register 34 for transfer back to the image sensing array 14 when the image sensing array 14 is operated as a digital frame buffer in the manner of this invention to be subsequently described herein.

The electronic camera 10 may be operated in four different modes the first of which is a preview mode during which the user of photographer composes and frames the scene to be ultimately recorded. During the preview mode, the shutter 20 is opened and the image is focused by the lens 18 onto the plane of the image sensing array 14 so as to provide a charge pattern corresponding to the analog image data. The analog image data from only those image sensing areas of the image sensing array 14 which reside in every other column superposed by a green filter and in alternate rows is transferred from the image sensing array 14, one line at a time, through the shift register 22 to the image storage array 16.

In one preferred embodiment in order to provide a photographic quality still print, there are provided in the image sensing array 14 624,640 discrete image sensing areas or pixels arranged in an array of 1280 vertical columns by 488 horizontal rows. During the transfer of image data in the aforementioned manner from the image sensing array 14 to the image storage array 16 through the shift register 22, every odd green column is discarded and every other row is discarded thereby requiring that the low resolution image storage array have 78,080 discrete image storing areas or pixels arranged in 320 columns by 244 rows.

The image data stored by the image storing array 16 is subsequently transferred on a line by line basis through the shift register 30 to the viewfinder display 38 by way of the analog multiplexing select circuit 36. In this manner, the image sensing array 14, the image storing array 16, and the shift registers 22 and 30 are operated as a frame transfer CCD providing a continuous stream of video information in the form of analog image data to the display 38.

As is readily apparent, the image data stored by the image storing array 16 represents a sampled image of the image originally sensed by the image sensing array 14. The resolution of the low resolution image storage array is selected to provide the minimum amount of image data which can be transferred to the cathode ray tube of the viewfinder display 38 in one standard television frame to provide an acceptable image on the viewing screen of the viewfinder display 38. The 320 by 244 pixel resolution of the image storing array 16 is generally equivalent to the resolution of current CCD arrays used in consumer television cameras; and, hence, sufficient image data is stored by the image storing array 16 to generate a satisfactory black-and-white image in the viewfinder display 38 while the remaining image data is discarded. Thus, during the preview mode there is eliminated the need to provide a large storage array or buffer memory equivalent to the resolution of the image sensing array 14 thereby also eliminating the need for high frequency transfer rates which would otherwise be required to transfer the image data out of the CCD array 12 at conventional television frame transfer rates.

When the user or photographer has composed and framed the desired scene to be photographed, he can initiate a recording of the desired scene on the disc memory 46 by operating the camera in a second record mode whereby the shutter 20 is closed and the transfer of image data from the image storing array 16 to the image storage array 16 is terminated. The image sensing array 14 thus contains the image data representative of the last scene viewed through the viewfinder display 38 immediately prior to the closing of the shutter 20. The two high resolution serial shift registers 22 and 24 thereafter operate to transfer the image data one line at a time from the image sensing array 14 to the A to D converters 40 and 42 which operate in a well-known manner to convert the analog format of the image data to a digital binary format. The digitized image data is thereafter compressed and serial shifted for recording by the magnetic disc memory 46 in a well-known manner. The transfer of image data in this manner is accomplished at a rate compatible with the magnetic disc memory data rate and the dark current limitations of the CCD array 12. The simultaneous use of the two serial shift registers 22 and 24 eliminates the need for transferring the image data through the storing array 16 as has heretofore been generally required in frame transfer CCD configurations thereby minimizing the losses due to charge transfer inefficiency.

After the image data has been recorded in the aforementioned manner, the user or photographer may wish to again review the scene which he has recorded to insure that it is framed and composed in the desired manner before making a still photographic print. Toward this end, the electronic camera 10 may be operated in a review mode whereby the digitized image data stored on the disc memory 46 may be transferred by the write control circuit 50 into the write shift register 34. During this transfer the digitized image data is sampled only from the image data previously transferred by the shift register 22 to the magnetic disc 46 and the least significant data bits discarded in a well-known manner. The digitized image data is further sampled from the recorded image data for every other column superposed by green filters and alternate rows of the high resolution sensing array 14. The sampled digitized image data is thereafter transferred by the write shift register 34 for storage in the image sensing array 14. After the sampled digitized image data has been stored in the image sensing array 14, the clock transfer frequency is increased to transfer the image data from the image sensing array 14 one line at a time by way of the shift registers 22 and 24. The sampled digitized image data transferred by the serial shift registers 22 and 24 is converted to a video signal format by the digital-to-analog converter 54 and thereafter directed to the viewfinder display 38 to provide the image of the scene as recorded on the magnetic disc 46. The sampled digitized image data transferred from the image sensing array 14 by the shift registers 22 and 24 is also redirected by way of the write control circuit 50 and the high resolution write shift register 34 back to refresh the image data stored by the image sensing array 14 so as to provide the viewfinder display with a continuous source of image data that is not deteriorated as a result of dark current and charge transfer inefficiency. Again, the digitized image data is sampled at a rate which provides the requisite image data to provide a satisfactory black-and-white display of the image of the viewfinder screen. Thus, the image sensing array 14 operates as a real time digital buffer memory during this mode of operation thereby eliminating the need to provide a separate high resolution buffer memory as was heretofore required.

After reviewing the image of the viewfinder display 38 which the user or photographer initially framed and composed, he may desire to provide a photographic still print by operating the electronic camera 10 in a print mode whereby the digitized image data stored on the magnetic disc 44 is transferred to the printer 48 in a well-known manner to provide the still print. As will be readily understood, the photographic print is a high resolution print based on all the image data initially sensed by the high resolution image sensing array 14.

Therefore, it will be appreciated that certain changes may be made in the above-described system and apparatus without departing from the scope of the invention herein involved. It is intended that all matter contained in this description thereof or shown in the accompanying drawings shall be interpreted as illustrative and not in a limiting sense.

What is claimed is:

1. An electronic camera for recording still images comprising:
    a two dimensional image sensing array comprising a predetermined number of discrete image sensing areas;
    a two dimensional image storing array comprising a predetermined number of discrete image storing areas, said predetermined number of discrete image storing areas being substantially less than said predetermined number of discrete image sensing areas;
    means for providing a viewfinder display;
    means for recording image data on a select recording medium; and
    means for controlling the sampling and transfer of image data from said image sensing array to said image storing array for storage therein during a preview mode of operation and for subsequently transferring said image data stored in said image storing array to said viewfinder display means to provide a visual display of said image data during said preview mode of operation, said image data control means being operable during a record mode of operation to control the transfer of image data from said image sensing array to said image recording means to enable said image data to be recorded by said recording means.

2. The electronic camera of claim 1 wherein said image sensing and storing arrays are configured as an integral CCD structure.

3. The electronic camera of claim 1 wherein said viewfinder display means comprises a video display and said predetermined number of discrete image storing areas is selected to provide the minimum amount of image data which can be transferred to said video display to provide a black-and-white image on said video display.

4. The electronic camera of claim 3 wherein said image data control means comprises a first serial shift register connected to receive image data from a first selected number of said discrete image sensing areas and a second serial shift register connected to receive image data from a second selected number of said discrete image sensing areas such that only said first serial shift register operates to transfer said image data from said image sensing array to said image storing array during said preview mode of operation and both said first and second serial shift registers operate to transfer image data from said image sensing array to said recording means during said record mode of operation.

5. The electronic camera of claim 4 wherein said discrete image sensing areas of said image sensing array are arranged in columns and rows wherein alternate columns are superposed by green filters and the columns between said alternate columns are alternately superposed by red and blue filters and said first serial shift register operates to transfer to said image storing array image data only from every other column superposed by a green filter and from alternate rows.

6. The electronic camera of claim 4 wherein said image data control means comprises a third serial shift register connected to receive image data from all said image storing areas of said image storing array such that said third serial shift register operates to transfer image data from said image storing array to said video display during said preview mode of operation.

7. The electronic camera of claim 6 wherein said image data control means also comprises analog-to-digital converter means for converting the image data received from said first and second serial shift registers from an analog format to a digital format for recording by said recording means.

8. An electronic camera for recording still images comprising:
   a two dimensional image sensing array comprising a predetermined number of discrete image sensing areas;
   means for providing a viewable display;
   means for recording image data on a select recording medium; and
   means for controlling the transfer of image data from said image sensing array to said image recording means to enable said image data to be recorded by said recording means during a record mode of operation and for controlling the sampling and transfer of image data from said recording means to said viewable display by way of said image sensing array to provide a visual display of said recorded image data during a review mode of operation wherein: said image data sensed by said image sensing array is in analog format; said image data control means comprises means for converting the image data received from said image sensing array during said record mode of operation to a digital format for recording by said recording means, and said image sensing array operates to momentarily store image data in digital format sampled from said recording means during said review mode of operation.

9. The electronic camera of claim 8 wherein said image data control means comprises means for redirecting the image data transferred from said image sensing array during said review mode of operation back to said image sensing array to refresh said image sensing array.

10. The electronic camera of claim 9 wherein said image data control means comprises a first serial shift register connected to receive said image data from a first selected number of said discrete image sensing areas and a second serial shift register connected to receive image data from a second selected number of said discrete image sensing areas such that the image data transferred from said recording means during said review mode of operation is sampled only from the image data transferred from said first selected number of said discrete image sensing areas during said record mode of operation.

11. The electronic camera of claim 10 wherein said discrete image sensing areas of said image sensing array are arranged in columns and rows wherein alternate columns are superposed by green filters and the columns between said alternate columns are alternatively columns are alternatively superposed by red and blue filters and said first serial shift register operates to transfer to said image storing array image data only from every other column superposed by a green filter and from alternate rows.

12. The electronic camera of claim 11 wherein said image data control means comprises a third shift register connected to transfer image data of every other column superposed by a green filter and of alternate rows received from said recording means to said image sensing array during said review mode of operation.

13. An electronic camera for recording still images comprising:
   a two dimensional image sensing array comprising a predetermined number of discrete image sensing areas;
   a two dimensional image storing array comprising a predetermined number of discrete image storing areas, said predetermined number of discrete image storing areas being substantially less than said predetermined number of discrete image sensing areas;
   means for providing a viewfinder display;
   means for recording image data on a select recording medium; and
   means for controlling the sampling and transfer of image data from said image sensing array to said image storing array for storage therein during a preview mode of operation and for subsequently transferring said image data stored in said image storing array to said viewfinder display means to provide a visual display of said image data during said preview mode of operation; for controlling the transfer of said image data from said image sensing array to said image recording means to enable said image data to be recorded by said recording means during a record mode of operation; and for controlling the sampling and transfer of image data from said recording means to said viewfinder display means by way of said image sensing array to provide a visual display of said recorded image data during a review mode of operation.

14. The electronic camera of claim 13 wherein said image sensing and storing arrays are configured as an integral CCD structure.

15. The electronic camera of claim 13 wherein: said viewfinder display means comprises a video display; said predetermined number of discrete image storing areas is selected to provide the minimum amount of image data which can be transferred to said video display to provide a black-and-white image on said video display; said image data sensed by said image sensing array is in analog format; said image data control means comprises means for converting the image data received from said image sensing array during said record mode of operation to a digital format for recording by said recording means; and said image sensing array operates to momentarily store image data in digital format sampled from said recording means at a rate to provide said black-and-white image on said video display during said review mode of operation.

16. The electronic camera of claim 15 wherein said image data control means comprises means for redirecting the image data transferred from said image sensing array during said review mode of operation back to said image sensing array to refresh said image sensing array.

17. The electronic camera of claim 16 wherein said image data control means comprises a first serial shift register connected to receive image data from a first selected number of said discrete image sensing areas and a second serial shift register connected to receive image data from a second selected number of said discrete image sensing areas such that only said first serial shift register operates to transfer said image data from said image sensing array to said image storing array during said preview mode of operation, both said first and second serial shift registers operate to transfer image data from said image sensing array to said recording means during said record mode of operation, and the image data transferred from said recording means during said review mode of operation is sampled from the image data transferred from said first selected number of said discrete image sensing areas during said record mode of operation.

18. The electronic camera of claim 17 wherein said discrete image sensing areas of said image sensing array are arranged in columns and rows wherein alternate columns are superposed by green filters and the columns between said alternate columns are alternately superposed by red and blue filters and said first serial shift register operates to transfer to said image storing array image data only from every other column superposed by a green filter and from alternate rows.

19. The electronic camera of claim 18 wherein said image data control means comprises: a third serial shift register connected to receive image data from all said image storing areas of said image storing array such that said third serial shift register operates to transfer image data from said image storing array of said video display during said preview mode of operation, and a fourth shift register connected to transfer image data of every other column superposed by a green filter and of alternate rows received from said recording means to said image sensing array during said review mode of operation.

20. The electronic camera of claim 19 further comprising means for providing a still print responsive to the image data stored by said recording means.

* * * * *